US011731722B2

(12) United States Patent
Louden

(10) Patent No.: US 11,731,722 B2
(45) Date of Patent: Aug. 22, 2023

(54) MODULAR CARGO SYSTEM FOR OFF-ROAD VEHICLE

(71) Applicant: Zhejiang CFMOTO Power Co., Ltd., Zhejiang (CN)

(72) Inventor: Jason John Louden, Minneapolis, MN (US)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 96 days.

(21) Appl. No.: 17/519,528

(22) Filed: Nov. 4, 2021

(65) Prior Publication Data

US 2022/0144363 A1  May 12, 2022

Related U.S. Application Data

(60) Provisional application No. 63/111,391, filed on Nov. 9, 2020.

(51) Int. Cl.
*B62J 9/26* (2020.01)
*B62J 9/27* (2020.01)
*B62K 5/01* (2013.01)

(52) U.S. Cl.
CPC . *B62J 9/26* (2020.02); *B62J 9/27* (2020.02); *B62K 5/01* (2013.01)

(58) Field of Classification Search
CPC ........ B62J 9/23; B62J 9/27; B62J 9/24; B60R 9/065
See application file for complete search history.

(56) References Cited

U.S. PATENT DOCUMENTS

| | | | | |
|---|---|---|---|---|
| 5,573,162 A | * | 11/1996 | Spencer | B62J 9/27 224/430 |
| D387,327 S | * | 12/1997 | Ethridge | D12/423 |
| 6,179,180 B1 | * | 1/2001 | Walker | B62J 11/00 224/457 |
| 6,209,941 B1 | | 4/2001 | Cross | |
| 7,128,341 B1 | * | 10/2006 | Dahl | B60R 9/06 180/908 |
| 7,954,853 B2 | | 6/2011 | Davis et al. | |
| 8,646,668 B2 | | 2/2014 | Oakes | |

(Continued)

OTHER PUBLICATIONS

Black Widow, Premium ATV Rear Cargo Box, https://www.blackwidowpro.com/atv/luggage-carrier/p/atv-cb-8030/, accessed Oct. 21, 2021.

(Continued)

*Primary Examiner* — Corey N Skurdal
(74) *Attorney, Agent, or Firm* — Shewchuk IP Services, LLC; Jeffrey D. Shewchuk

(57) ABSTRACT

A modular cargo system for an off-road vehicle includes a triangular center case between a right side case and a left side case, each having a base attached downwardly to a platform on the vehicle while also defining a floor plane for resting on a flat floor surface. The side cases include non-parallel side walls, each defining an interior space large enough to hold a rider's helmet. Each case includes a handle on a hinged lid, enabling the side case to be carried with a single hand while the lid is closed. The hinge is on a leading side wall of the cases, latched on a trailing side wall of the cases, and clips to hold the side cases downward to the platform are on the trailing side walls.

21 Claims, 11 Drawing Sheets

(56) References Cited

U.S. PATENT DOCUMENTS

| | | | |
|---|---|---|---|
| 10,858,056 B2 | 12/2020 | Mann | |
| 10,875,462 B2* | 12/2020 | Chapdelaine | ............ B60R 9/065 |
| 11,364,852 B2* | 6/2022 | Robillard | ................... B62J 9/27 |
| 2007/0181623 A1* | 8/2007 | Schneider | .............. B62K 19/46 |
| | | | 296/37.1 |

OTHER PUBLICATIONS

Pazoma, 36L Motorcycle Aluminum Side Cases Kit Luggage Pannier Cargo Bags Saddlebags Large Side Boxes For BMW R1200GS F800GS Adventure Universal, https://www pazomaracing.com/products/36I-motorcycle-left-right-side-cases-kit-luggage-pannier-cargo-bags-saddlebags-large-side-boxes-for-triumph-bmw-r1200gs-f800gs-adventure-universal?variant=29496660066415, accessed Oct. 21, 2021.

Cabela's, Cabela's Tac Gear ATV Rear Padded Bag, https://www.cabelas.com/shop/en/cabelas-tac-gear-atv-rear-padded-bag, accessed Oct. 21, 2021.

Ystylish Store, ATV Storage Seat Rear 4 Wheeler Back Seat ATV Cooler Rear Mount Cargo Camo S, www.cuneot.top/index.php?main_page=product_info&cpath=2_170_376_4985&products_id=14668, accessed Oct. 21, 2021.

* cited by examiner

MODULAR CARGO SYSTEM FOR OFF-ROAD VEHICLE

CROSS-REFERENCE TO RELATED APPLICATION(S)

The present application claims priority from U.S. Provisional Application No. 63/111,391 entitled MODULAR CARGO SYSTEM FOR OFF-ROAD VEHICLE filed Nov. 9, 2020, incorporated herein by reference.

BACKGROUND OF THE INVENTION

The present application relates to off-road vehicles, such as straddle all-terrain vehicles ("ATVs"), utility vehicles or side-by-sides. Such vehicles are well known for travel over a wide variety of terrains, including over unpaved trails or fields, rocks, etc. Such vehicles are widely used in agriculture and forestry operations, as well as in safety operations such as for rugged mountain crossings. Such vehicles are also widely used for recreational enjoyment in natural, outdoor settings away from pavement.

In recent years, recreational enjoyment has sparked interest in using off-road vehicles for multi-hour or multi-day trips off pavement and without permanent shelter, on excursions sometimes referred to as "overlanding". Overlanders commonly want to pack a considerable amount of gear for their trip, including tents, sleeping bags and other camping equipment, fishing tackle, hunting supplies, spare clothes and shoes and other gear. Many off-road vehicles include front and rear racks or platforms with an open top surface to which gear can be strapped down such as using ties and/or bungie cords. Placement of gear onto such racks or platforms typically leaves the gear (or at least the bag containing the gear) exposed to weather and elements such as mud splashing while travelling. Placement of gear onto such racks or platforms also allows others to see the attached gear, making the expected use of the vehicle known to nosy neighbors and inviting theft of equipment.

Cargo and storage solutions which enclose gear used with off-road vehicles are known, such as disclosed in U.S. Pat. Nos. 5,573,162, 6,209,941, 7,128,341, 8,646,668, and 10,875,462. Such containers need to be strong, robust and reliable over years or decades of use. The connection method for attaching an enclosed container to an off-road vehicle needs to be foolproof and secure, ensuring that the container and/or its contents does not become dislodged as the vehicle bounces over hills, logs, rocks and bumps. Unfortunately, existing cargo and storage solutions have failed to provide users with the utility desired for many applications. Better cargo and storage solutions, intended for offroad vehicles and particularly for overlanding with an offroad vehicle, are needed.

BRIEF SUMMARY OF THE INVENTION

The present invention is a cargo and storage solution particularly appropriate for off-road vehicles, as well as a method of using/attaching such a modular cargo system to the off-road vehicle. The system includes a right side case and a left side case, preferably mounted adjacent a center case. Each case has an enclosure defining an interior space and an attached moveable lid, with the side cases being large enough to hold a helmet of a rider of the offroad vehicle. In one aspect, the side case enclosures have a base which is removably attached downwardly onto a platform of the offroad vehicle while also defining a floor plane of the enclosure allowing the enclosure to rest on a flat floor surface when not attached to the offroad vehicle. In another aspect, each side case includes a handle, such as part of the lid, enabling the side case to be carried with a single hand.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
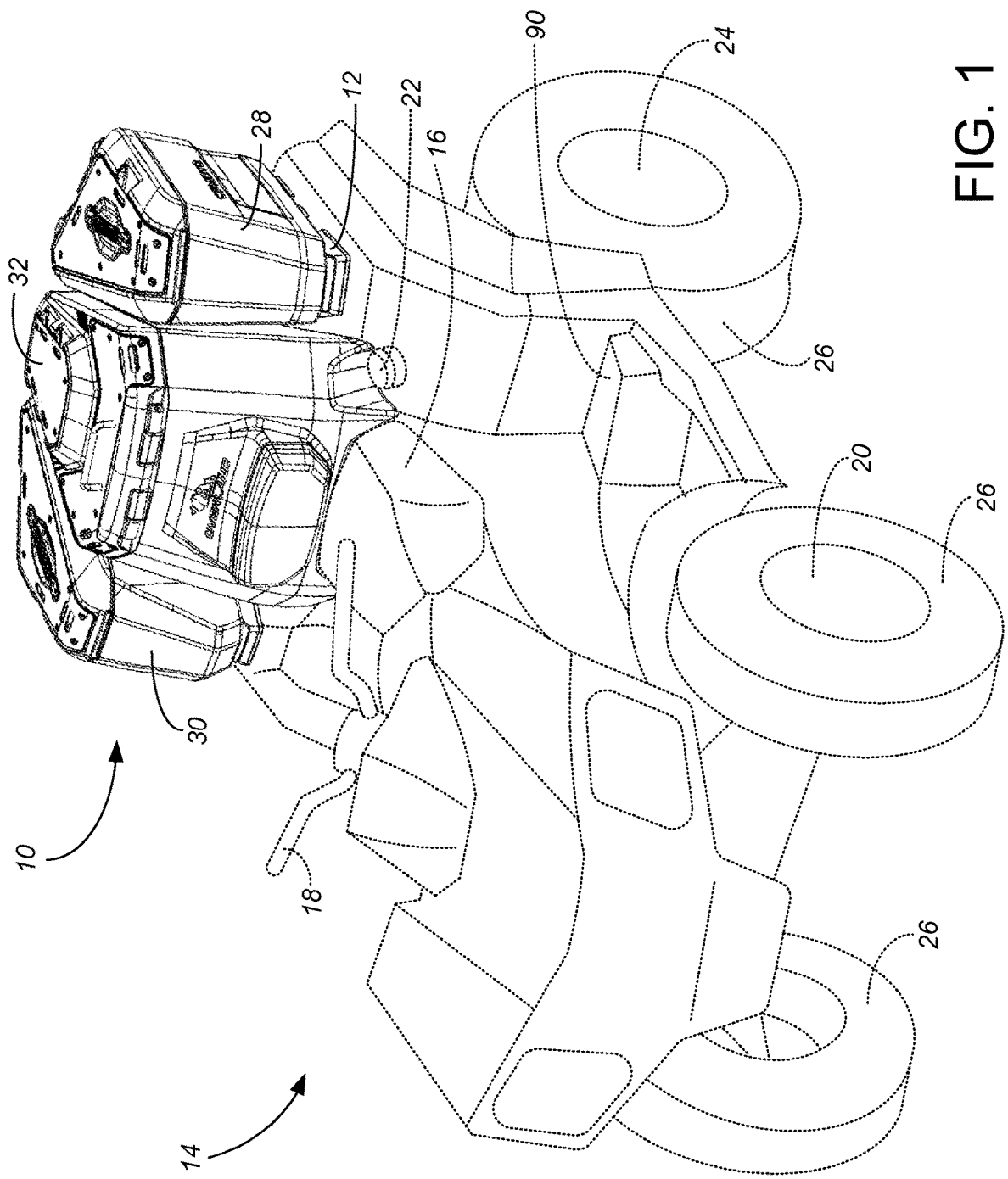
FIG. 1 is a perspective view of an ATV (shown in dashed lines) with the preferred modular cargo system of the present invention mounted thereon.
Figure 2:
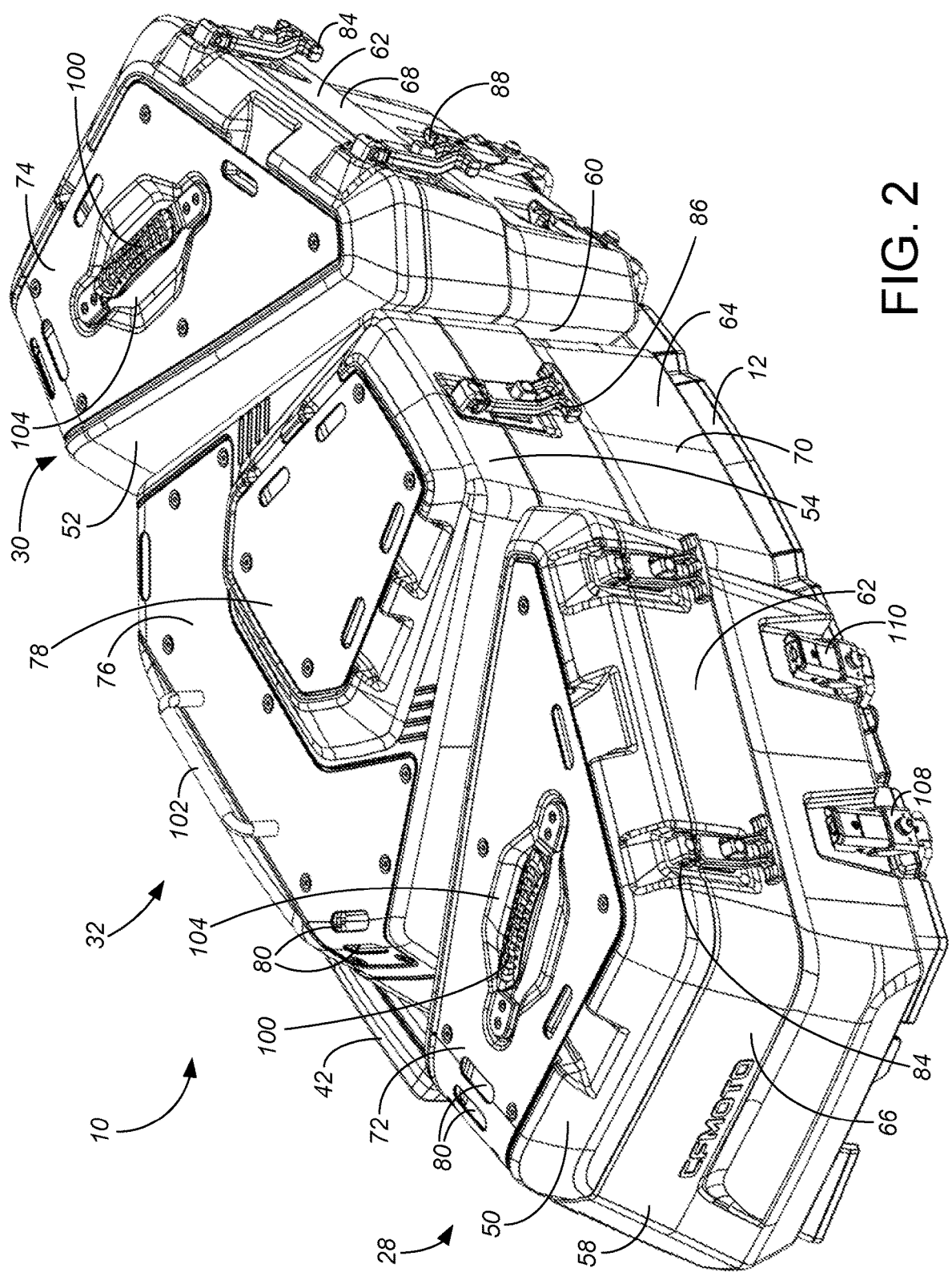
FIG. 2 is a perspective view from the side-rear of the preferred modular cargo system of the present invention, also showing a portion of the underlying platform.
Figure 3:
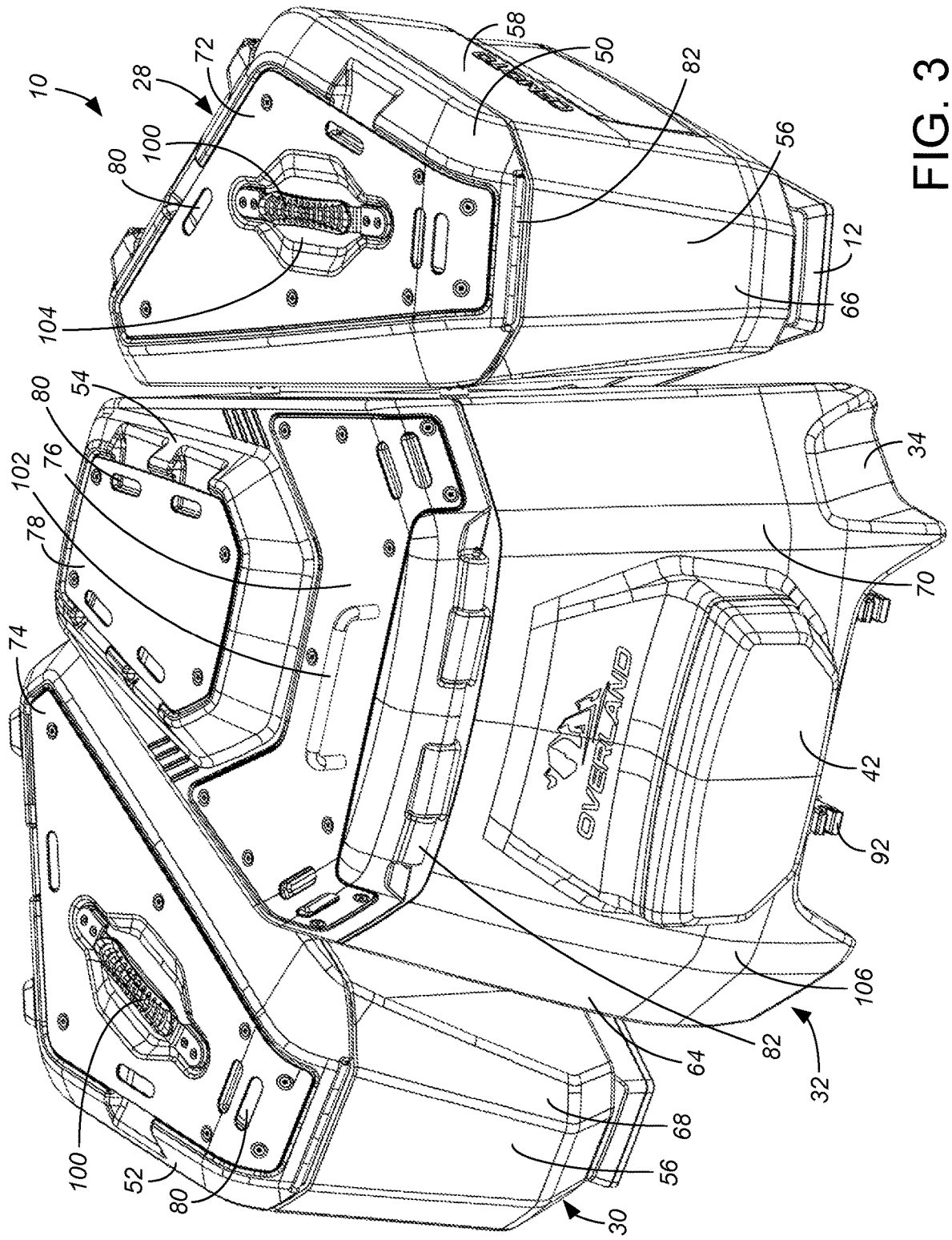
FIG. 3 is a perspective view from the front of the modular cargo system and underlying platform of FIGS. 1 and 2.

A first preferred embodiment of the modular cargo system 10 of the present invention is shown with reference to FIGS. 1-11. As shown in FIG. 1, the cargo system 10 is particularly intended to be mounted on a relatively flat platform 12 at the back of an ATV 14. While the offroad vehicle could alternatively be a utility vehicle or a side-by-side vehicle, this ATV 14 includes a straddle-type seat 16 and handle bars 18 for steering the front wheels 20, which are mounted for high suspension travel and high ground clearance (in the most preferred embodiment, about 12 in. (30 cm) of ground clearance). The vehicle 14 is powered by an internal combustion engine, with the most preferred ATV 14 including a V-twin two cylinder engine of about 1000 cc displacement, putting out about 75-80 horsepower (about 60 ft-lbs/80 NM of peak torque). Fuel is added through the fuel filler cap 22 for the fuel tank. The ATV 14 rides on four wheels 20, 24 for stability, with low pressure, wide tires 26 for gripping over sand, loose gravel, mud etc. With the straddle-type seat 16, the vehicle 14 is relatively narrow, with the most preferred ATV 14 having an about 58 in. (148 cm) wheelbase.

Figure 4:
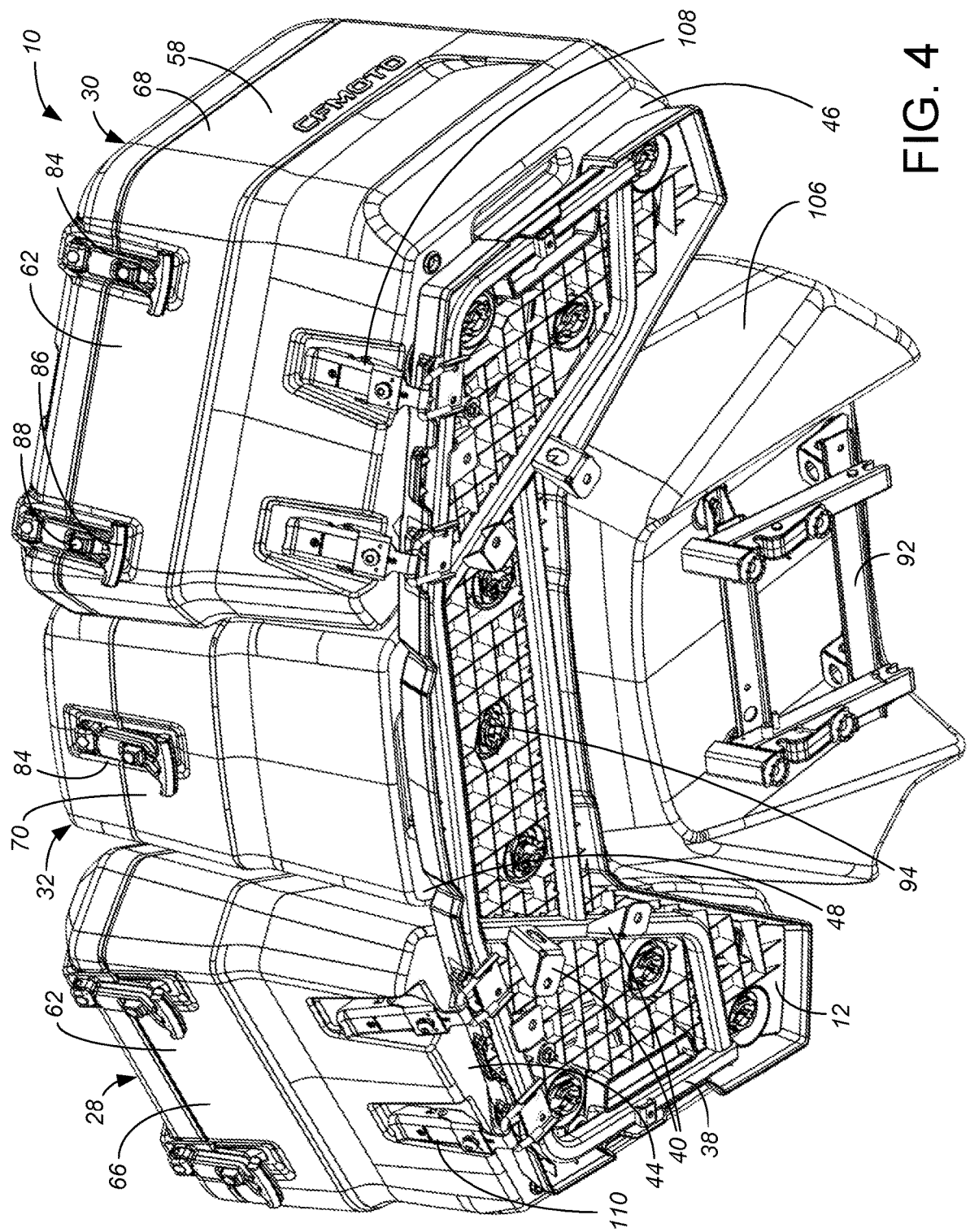
FIG. 4 is a perspective view from below-rear, showing the underlying platform and modular cargo system of FIGS. 1-3.
Figure 5:
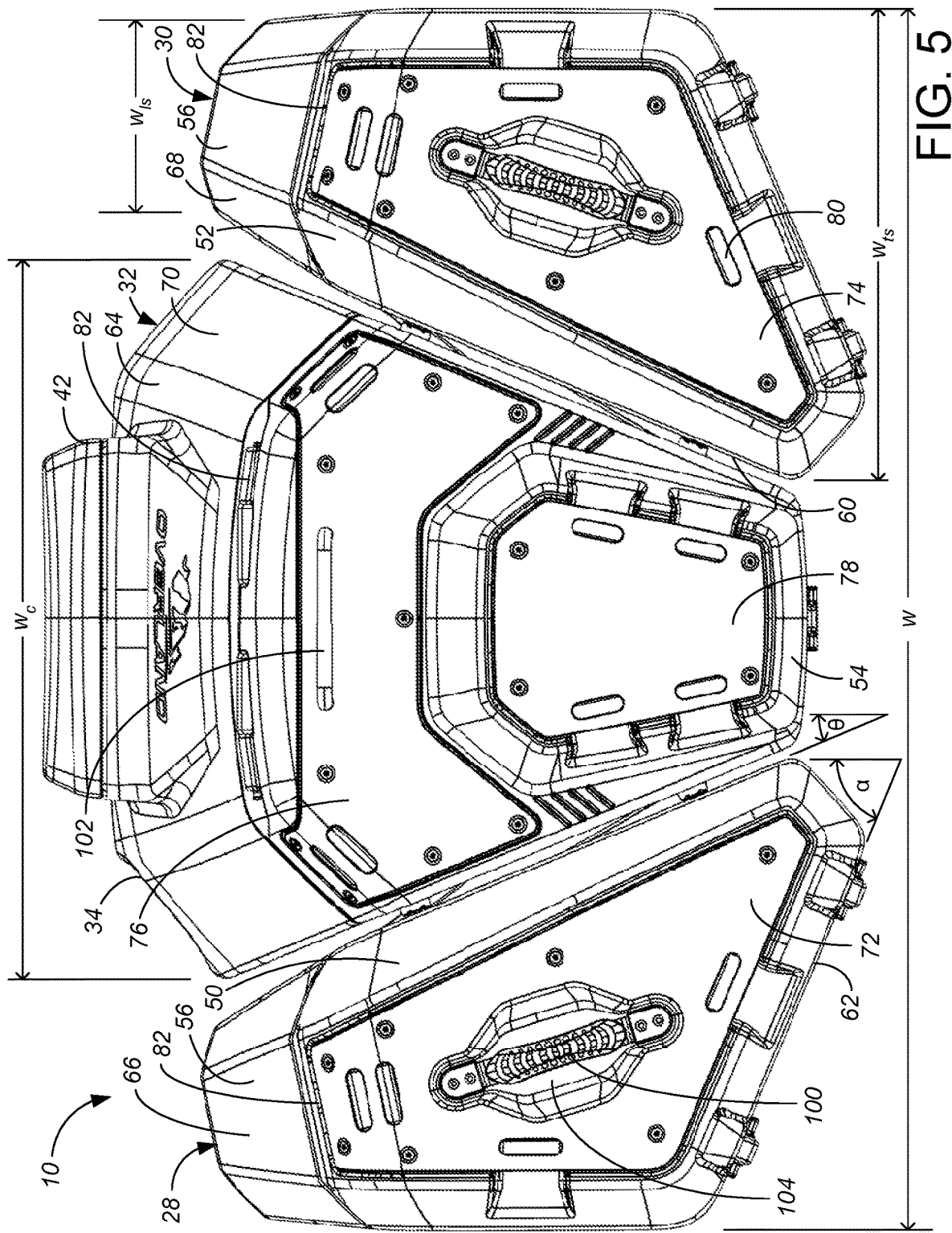
FIG. 5 is a plan view from above of the modular cargo system of FIGS. 1-4.
Figure 6:
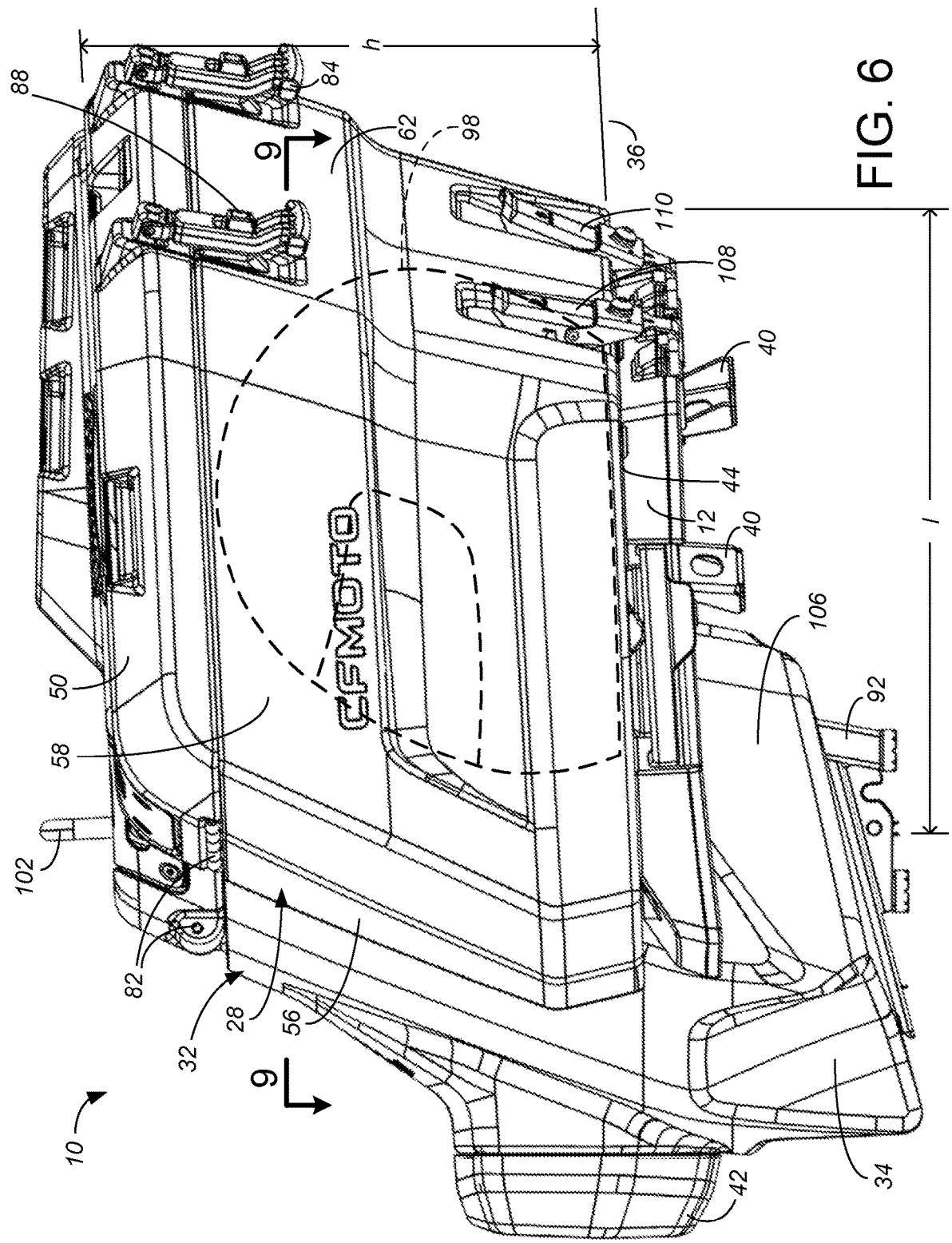
FIG. 6 is a side elevational view of the modular cargo system and underlying platform of FIGS. 1-5, with the size and location of a helmet within a side case being shown in dashed lines.
Figure 7:
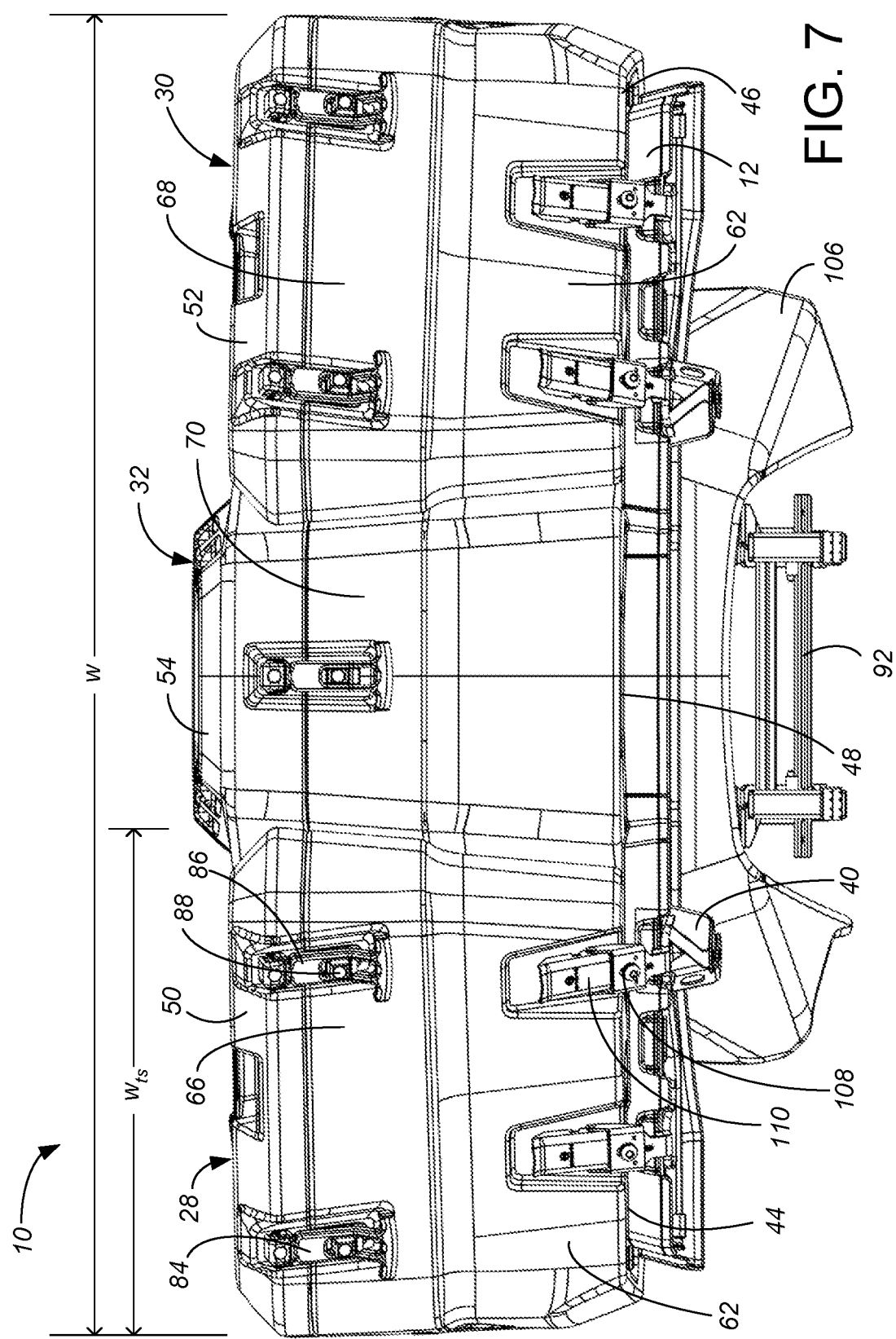
FIG. 7 is a rear elevational view of the modular cargo system and underlying platform of FIGS. 1-6.
Figure 8:
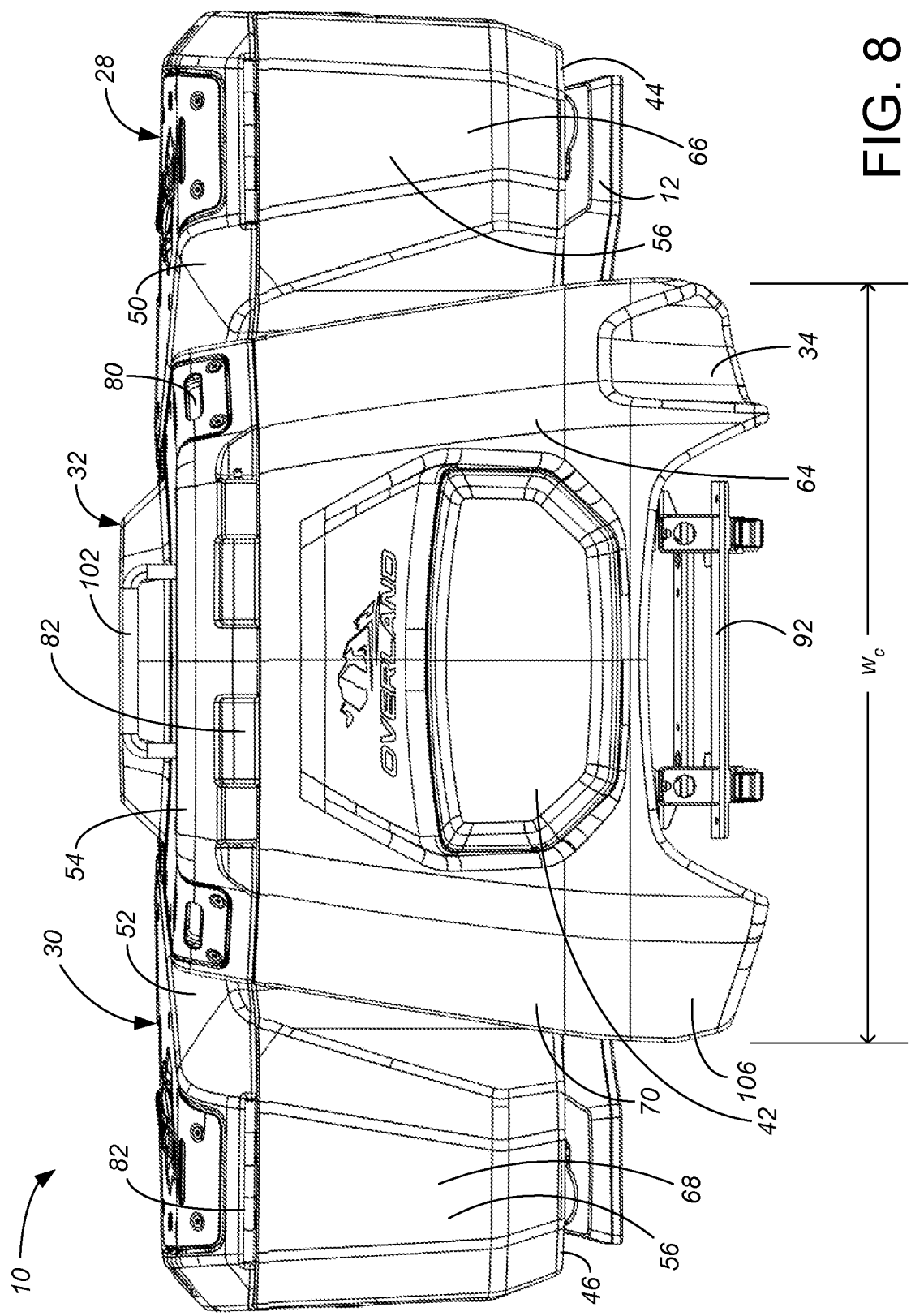
FIG. 8 is a front elevational view of the modular cargo system and underlying platform of FIGS. 1-7.
Figure 9:
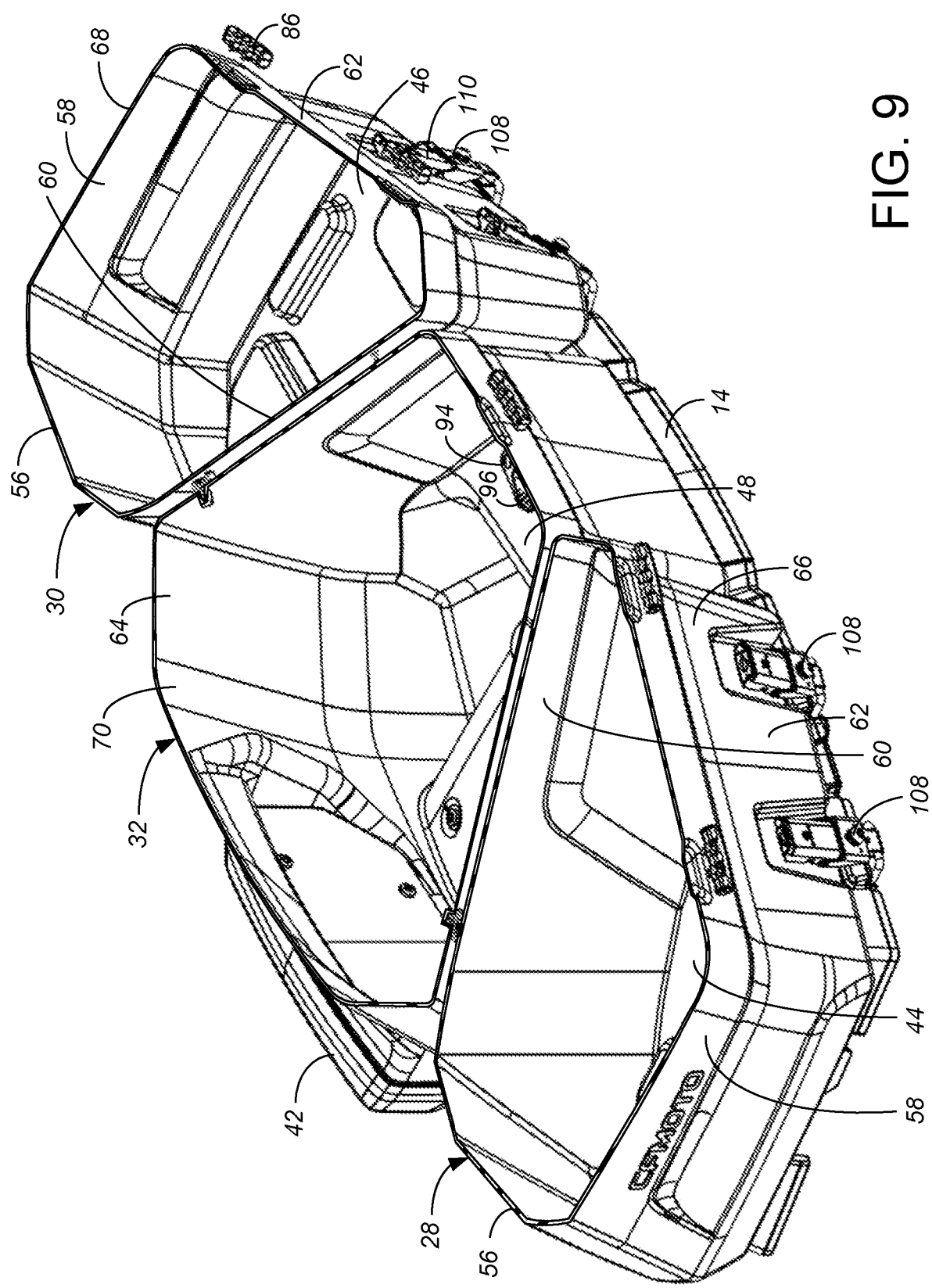
FIG. 9 is a perspective cross-sectional view, taken along cut line 9-9 in FIG. 6, to show the interiors of the three cases.

In this most preferred embodiment, the cargo system 10 of the present invention includes three storage cases: a left side case 28 entirely on one side of the vehicle 14, a right side case 30 entirely on the other side of the vehicle 14, and a center case 32 which bridges the vehicle longitudinal center line. The preferred left side case 28 and right side case 30 are mirror images of each other. The preferred center case 32 is nearly bilaterally symmetrical, except that one of the front corners includes a recess 34 to allow better access to the fuel cap 22 and to allow better clearance for fueling the vehicle 14. The three cases 28, 30, 32 attach onto a flat rear platform 12 that generally establishes a base plane 36. As best shown in FIG. 4, the rear platform 12 can be a composite shelf attached to a steel rack frame 38 mountable by bolted (or welded) attachment to the frame of the vehicle 14 using attachment mounts 40. As best seen in FIG. 6, the base plane 36 need not be entirely horizontal, but instead will depend upon the platform 12 (or the underlying floor), how the platform 12 attaches to the vehicle 14, and how level the ground is where the vehicle 14 is parked. In addition to extending over the rear platform 12, the center case 32 can extend forwardly and provide a padded rear back rest 42 for a single vehicle driver.

Figure 11:
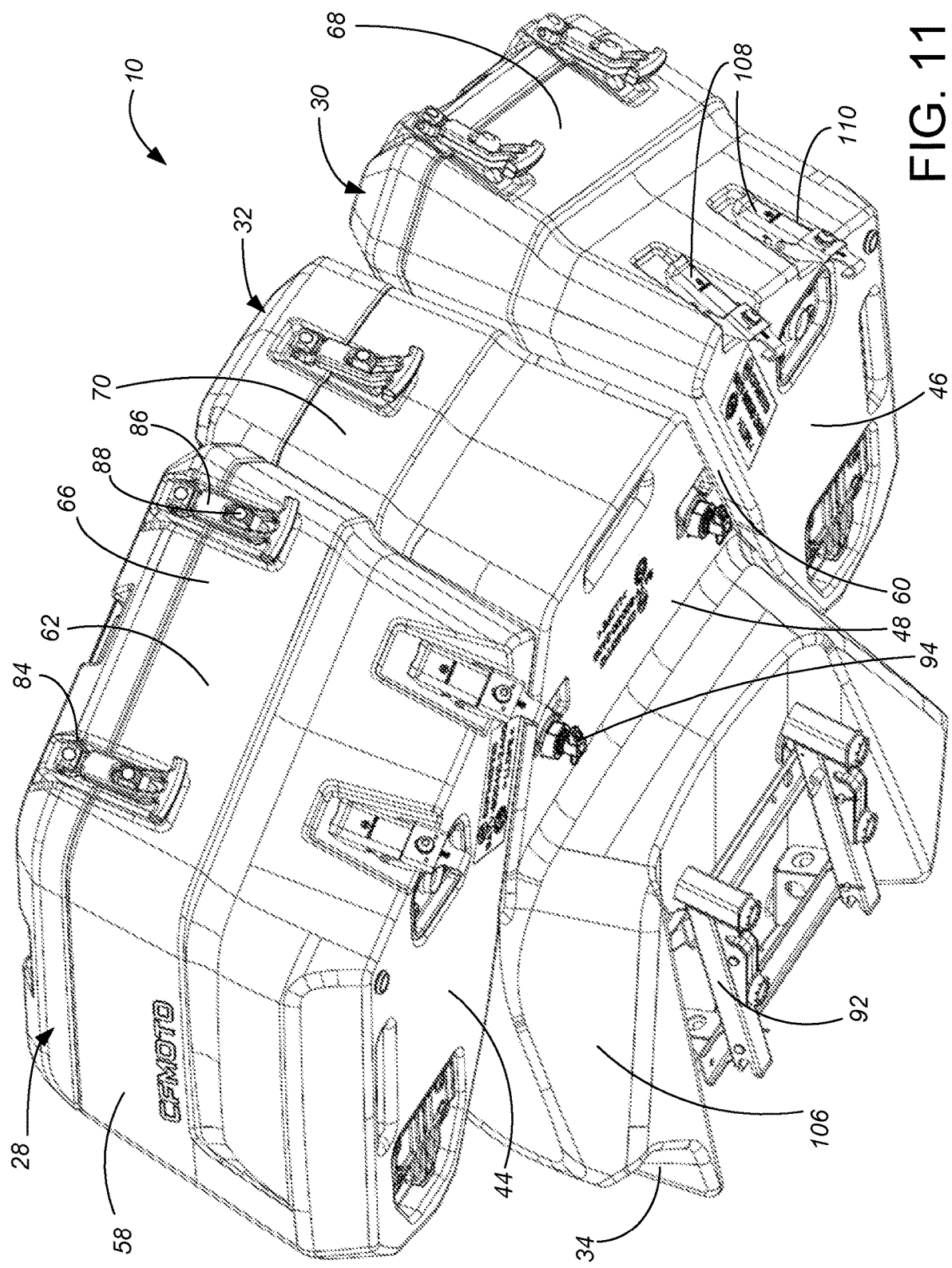
FIG. 11 is a rear elevational view of the modular cargo system of FIGS. 1-10 from below.

Each of the three cases 28, 30, 32 include a generally horizontal, flat base 44, 46, 48, a generally horizontal (when closed), flat lid 50, 52, 54, and generally vertical, planar side walls 56, 58, 60, 62, 64 extending from each base 44, 46, 48 to its lid 50, 52, 54. As best seen in FIG. 11, the bases 44, 46, 48 need not be entirely flat and may have some contours to allow for better connection or clearance over the rear platform 12, so long as there is sufficient surfaces to define the base plane 36 so the side cases 28, 30 in particular can rest flat on a flat surface. In the preferred construction, each base is jointly molded with its side walls into an enclosure 66, 68, 70, such as by blow molding or rotational molding. While the exterior height h of the most preferred side cases 28, 30 is about 13 in. (33 cm), the interior depth of the side case enclosures 66, 68 is about 10 in. (26 cm), i.e., 10-20% of the interior size is preferably provided by upwardly recessing the inside of the lid 50, 52, 54.

The enclosures 66, 68, 70 are preferably formed of a polymer material such as polyethylene (including high density polyethylene, or HDPE), polypropylene, polyvinylchloride (PVC), acrylonitrile butadiene styrene (ABS), or similarly rigid polymer materials. Each lid 50, 52, 54 is also primarily made of a similar polymer material, but preferably includes one or more separate metal top plates 72, 74, 76, 78, which can be attached to its molded lid 50, 52, 54 using fasteners such as screws or rivets, or by adhesive or insert molding. To reduce the number of parts, the metal top plates 72, 74 for the side cases 28, 30 can be identical to each other, with one flipped over prior to attachment to its lid 50, 52. The metal top plates 72, 74, 76, 78 are not only rugged for protection of the lids 50, 52, 54 from marring and scratches, but also include several cut outs or hook openings 80 for tie or bungie hook attachment. As examples, the enclosures 66, 68, 70 and the lids 50, 52, 54 can have a polymer wall thickness of about 2-4 mm, and the top plates 72, 74, 76, 78 can be stamped out of aluminum or stainless steel sheet material, such as having a thickness in 1.5-3 mm thickness.

Each lid 50, 52, 54 is attached to a front wall 56, 64 of the side walls via a hinge 82. One or more latch mechanisms 84 are preferably included on the rear wall 58 of each enclosure 66, 68, 70, moveable to secure the lid 50, 52, 54 closed. For instance, the preferred lids 50, 52, 54 are latched closed with an elastic strap 86 that can be pulled around a latching knob 88 projecting outwardly from the rear wall 58. A compressible seal (not shown) can be positioned between the lid 50, 52, 54 and its enclosure 66, 68, 70. In the most preferred embodiment, each case 28, 30, 32 provides an IP54 rating, i.e., the contents are not sealed entirely dust free but are protected against all particulates of 1 mm and larger and against most dust ingress, and the seal will withstand splashing of water from any angle but may not withstand strongly sprayed water or water immersion.

When desired, the center case 32 can be removed and replaced with a passenger seat (not shown), so a passenger can straddle the vehicle 14 immediately behind the driver, perhaps using passenger footrests 90 and perhaps looking over the driver's shoulder. The shape of the center case 32 is somewhat determined by the space needed for such a passenger seat, including a substantially triangular shape which is wider at the front than at the rear. The front end of the center case 32 can preferably be secured with the same mounting system 92 as utilized by the removeable passenger seat, or alternatively a removable platform portion could be provided under a portion of the center case, for attachment after the passenger seat has be removed but prior to attaching the center case down. The rear end of the center case 32 can preferably be secured with one or more accessory attachment devices 94, such as disclosed in U.S. patent application Ser. No. 17/332,676, incorporated by reference, which cooperate with openings in the platform 12. These devices 94 haves an attachment mechanism control handle 96 accessible by hand only through the access opening defined by the lid 54. Hand movement of the attachment mechanism control handles 96 in one direction tightens the center case base 48 downwardly onto the platform 12 of the ATV 14, and hand movement of the attachment mechanism control handles 96 in an opposing direction allows detachment of the center case base 48 from the platform 12 of the ATV 14. Positioning the accessory attachment devices 94 so they attach downward from inside the center case 32 provides an attachment that is concealed, but can also requiring emptying of some or all of the contents of the center case 32 before attaching or removing the center case 32 from the vehicle 14.

The side cases 28, 30 have a size and shape which is beneficial for overlanding, when considering that the side cases 28, 30 are likely to hold different contents at different times, even during the same trip. In particular, the side cases 28, 30 are designed to a) allow for quick removal from the ATV 14, useful when contents (such as clothing) are being packed or unpacked (such as in a bedroom) into the side case before the trip (such as in a tent), once at a destination, or after a trip; b) be able to be set down with the base 44, 46 on a flat floor surface with the side walls standing upright and the lid 50, 52 at the top; c) be carried using a single hand; d) be quickly securable to the ATV 14 to maintain the contents generally dust, splash and precipitation-protected and still secure while the ATV 14 is being driven to or from the destination; and e) when the side cases 28, 30 have been partially or fully unpacked at a destination, have sufficient size to hold the gear that was used during riding to the destination, most importantly a helmet 98 such as during an overnight stop. Many prior art side cases fail to consider storage of riding gear including a helmet 98 once at the destination, and are too small or the wrong shape to hold a helmet 98, and therefore fail to achieve this important benefit. While helmets come in many shapes and sizes, a minimum size for the smallest helmets can be considered a size sufficient to hold an 8 in. (20 cm) diameter sphere. A more typical helmet size, such as the helmet 98 shown in dashed lines in FIGS. 6 and 10, would be oblong, with a width of about 10 in. (26 cm), a height of about 10 in. (26 cm), and a length of about 13 in. (32 cm). Many other prior art side cases, such as panniers of a motorcycle, do not have a base intended to allow the pannier to stand upright when placed on the floor, or, even if they do, still have the mechanism for attachment to the vehicle being through the sidewall of the pannier rather than through the base.

Figure 10:
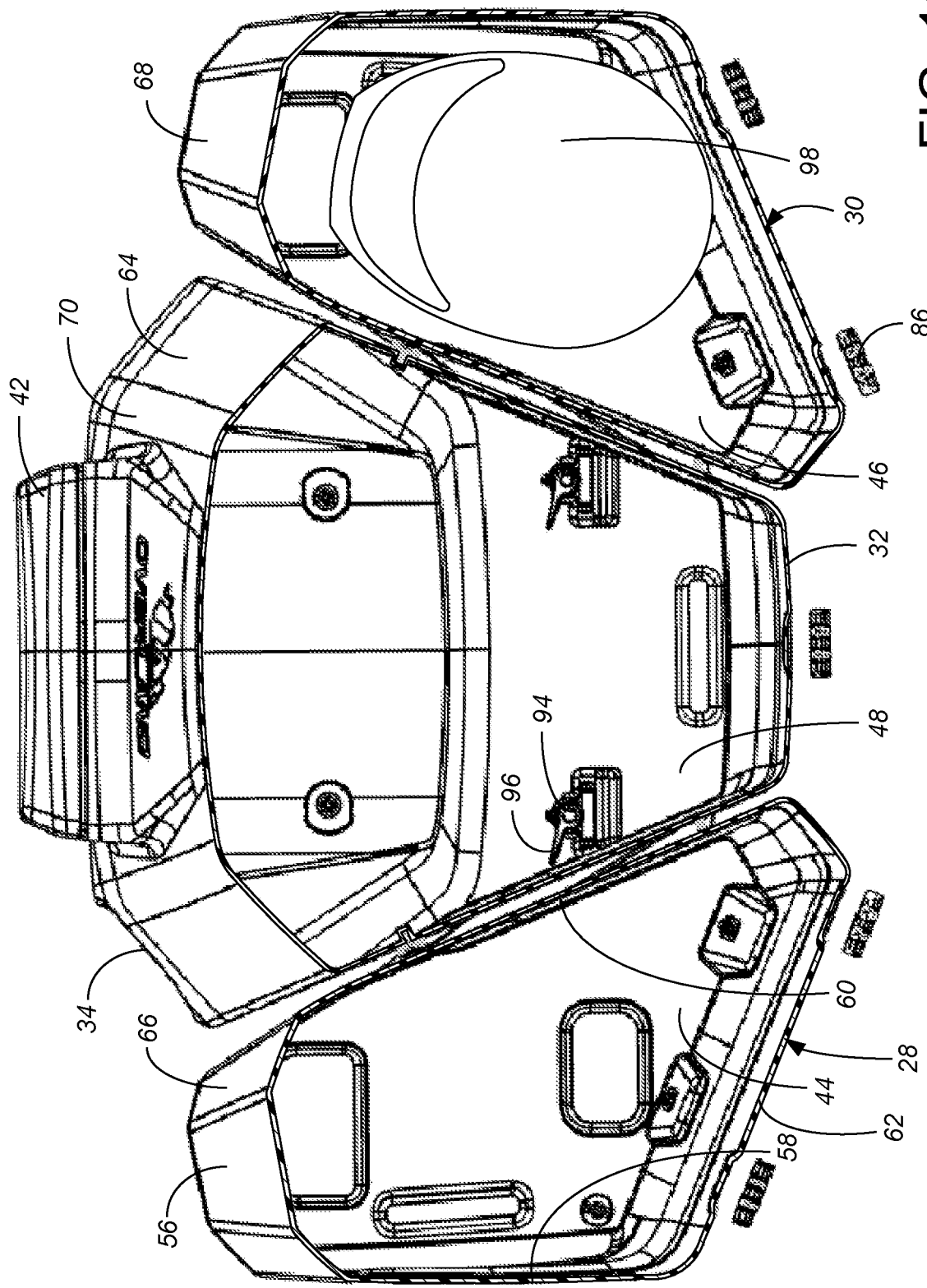
FIG. 10 is a cross-sectional plan view, taken along the same cut line 9-9 in FIG. 6, and showing the size and location of a helmet within a side case.

To ensure that the side case interiors can be sufficiently sized to each hold a helmet 98, but still allow attachment in the available space on opposing sides of the ATV 14 and while allowing the option of a second straddle rider, the bases 44, 46 and lids 50, 52 of the preferred side cases 28, 30 are not rectangular, but instead the preferred side cases 28, 30 have a fairly distinct and unusual planview shape. The preferred shapes are perhaps best shown in FIG. 10 showing how a helmet 98 fits in one of the side cases 30. The outer side wall 58 of each side case 28, 30 extends nearly parallel to the longitudinal direction of the vehicle 14. For example, the distance between the outer side walls 58 of the two side cases 28, 30, which defines the width w of the modular cargo system 10, may be about 80% of the vehicle's wheel base, such as a width w of the modular cargo system 10 being about 46 in. (116 cm) for an ATV 14 with a 58 in. (148 cm) wheelbase. Each side case 28, 30 is relatively narrow at its leading side wall 56, thereby providing more room for the second rider on the occasions when the center case 32 is replaced with a rider's seat. For instance, the preferred center case 32 has an overall center case width $w_c$ of about 27 in. (68 cm), and the leading side walls 56 of the side cases 28, 30 have an exterior width $w_{ls}$ of only about 7-8 in. (18-20 cm). With a typical motorcycle helmet 98 being about 10 in (26 cm) wide, the front of each side case enclosure 66, 68, 70 is too narrow to accommodate a helmet 98. Instead of being parallel to the outer side wall 58, the inner side wall 60 extends at a significant angle $\theta$, greater than 10°, to the longitudinal direction. For instance, the preferred angle $\theta$ of the inner side wall 60 is about 23°. The angle $\theta$ of the inner side wall 60 causes the side case 28, 30 to widen out to a center section used for holding the helmet 98 toward the back of the side case enclosure 66, 68, 70. At the trailing edge of the outer side wall 58, the side case 28, 30 has a width $w_{ts}$ which is 150% or more than the leading side wall width $w_{ls}$, such as a width $w_{ts}$ of about 16 in. (40 cm). In other words, though the interior width at the leading side wall 56 of the side cases 28, 30 is too narrow to hold a helmet 98, the interior width at the trailing side wall 62 of the side cases 28, 30 is amply wide to hold a helmet 98. The length 1 of the side cases 28, 30 usable for holding the helmet 98 (i.e., measured from the midpoint of the leading side wall 56 to the midpoint of the trailing side wall 62) is about 21 in. (53 cm).

The lid 50, 52, 54 is hinged to the leading side wall 56, so when pivoted about the hinge, the lid 50, 52, 54 is fully out of the way and allows unrestricted access for placing a helmet 98 or other gear into the back of the interior space. This hinge location also allows best loading and unloading of cargo and gear into all three cases 28, 30, 32 (such as selecting which case 28, 30, 32 to place each piece of gear into) when the user is standing behind the vehicle 14. The securing latch or latches 84 for the lids 50, 52, 54 are located on the trailing side wall 62.

The access opening or mouth of the enclosure 66, 68 (defined by the location where the side walls 56, 58, 60, 62 meet the lid 50, 52) is preferably larger in planview than the typical helmet 98 so the helmet 98 can be placed into the enclosure 66, 68 by vertically lowering the helmet 98 into place. Alternatively the mouth can be slightly smaller in length than the interior length at a midheight elevation of the enclosure 66, 68, requiring one end of the helmet 98 to be lowered into place and pushed against the sidewalls before lowering the other end of the helmet 98 through the mouth.

The trailing side wall 62 of the side cases 28, 30 can be at an angle $\alpha$ relative to the longitudinal direction of the vehicle 14, such as at an angle $\alpha$ of about 67°. This angling creates an open space at the inside, rear of the enclosure 66, 68 which is very useful for the user to position his or her hand under the bottom of the helmet 98 when taking the helmet 98 out of the enclosure 66, 68. In other words, the size and shape of the enclosure 66, 68 should be large enough not only to store the helmet 98 within the enclosure 66, 68, but also allow for easy hand removal of the helmet 98 from the enclosure 66, 68 against the weight of gravity. With the most preferred size and shapes of the side cases 28, 30, each side case 28, 30 encloses a volume of about 52 liters. The most preferred center case 32 provides an additional volume of about 41 liters, for a total case storage volume of about 146 liters.

Each case 28, 30, 32 includes a handle 100, 102 allowing the case to be carried by a single hand. The preferred lids 50, 52 for the side cases 28, 30 include a recess 104 for the handle 100, so the handle 100 remains below the plane of the top plate 72, 74, making it easier to stack additional gear on top of the top plate 72, 74. Because the side cases 28, 30 are longer than they are wide, the preferred handles 100 in the side cases 28, 30 extend primarily in the longitudinal direction. In contrast, with the more triangular and wider shape of the preferred center case 32, the center case handle 102 extends primarily in the transverse direction. The center case handle 102 can be provided quite far forward on the center case 32 relative to its top surface, including locating the center case handle 102 further forward than either side case handle 100. This far-forward center case handle location is particularly in situations where the center case 32 includes a forward section 106 dropping down below the platform height 36 and in situations where the center case 32 includes a backrest pad 42. Both the backrest pad 42 and the forward section 106 help to balance the weight of the center case 32 when it is being carried with the far-forward handle 102. At this far forward location, the center case handle 102 need not be recessed below the top plate 76, but instead can extend above the center case top plate 76 and provide a forward fence for the center case top plate 76, helping to keep gear strapped to the center case top plate 76 from pressing into the back of the driver such as during braking the vehicle.

Each of the three cases 28, 30, 32 are removable and attachable through a quick-attach system incorporated into the case 28, 30, 32. As was done for the center case 32, accessory attachment devices such as disclosed in U.S. patent application Ser. No. 17/332,676 could be used for the side cases 28, 30. More preferably, the side cases 28, 30 include clips 108 with a clip handle 110 mounted on one of the exposed side walls 56, 58, 62, most preferably on the rear side wall 62. Movement of the clip handle 110 in one direction tightens the base 44, 46, 48 downwardly onto the platform 12, and movement of the clip handle 110 in an opposing direction allows detachment of the base 44, 46, 48 from the platform 12. With the clips 108 being exposed, the side cases 28, 30 can be quickly removed or attached to the platform 12 without requiring opening of the lid 50, 52 and regardless of whether the side case enclosures 66, 68 are empty or full. The clips 108 should either not hang down below the base plane 36 at all, or should be easily moveable to entirely above the base plane 36, so each side case 28, 30 can be placed on a flat floor surface without interference from the clips 108. In general usage, the side cases 28, 30 will be removed, carried and attached much more frequently (i.e., probably both before and after each overlanding trip, and while at each overlanding destination), whereas the center case 32 (which may not rest as flatly on the floor) will only be removed on occasions when it is replaced with the passenger seat. To attach each side case 28, 30 to the platform 12, the user merely places the side case 28, 30 upon the platform area generally in position against the center case 32, and then moves the clip handle 110 to the closed position by hand to secure the enclosure 66, 68 to the platform 12.

If desired, security features such as locks (not shown) for the latches 84 and for the clips 108 can be added as desired, for either locking the lids 50, 52, 54 to the enclosures 66, 68, 70 or for locking the side cases 28, 30 to the ATV 14. The latches 84 and the clips 108 can also be placed sufficiently close to one another that a single external padlock (not shown) could be used for both locking the lid 50, 52 closed and locking the side case 28, 30 to the ATV 14.

Although the present invention has been described with reference to preferred embodiments, workers skilled in the art will recognize that changes may be made in form and detail without departing from the spirit and scope of the invention. In particular, all of the dimensions and materials, unless included in the claims, are exemplary only.

The invention claimed is:

1. A modular cargo system for an offroad vehicle comprising:
    a first side case, the first side case having
        a first enclosure defining a first interior space, the first interior space being large enough to hold a first helmet of a rider of the offroad vehicle, the first enclosure being adapted to be removably attached to the offroad vehicle entirely on a first side of a longitudinal centerline of the offroad vehicle; and
        a first lid movably connected to the first enclosure and sealing the first enclosure in a closed position, the first lid being moveable to provide an access opening to the first enclosure;
    a second side case, the second side case having
        a second enclosure defining a second interior space, the second interior space being large enough to hold a second helmet of a rider of the offroad vehicle, the second enclosure being adapted to be removably attached to the offroad vehicle entirely on a second side of the longitudinal centerline of the offroad vehicle opposite the first side; and
        a second lid movably connected to the second enclosure and sealing the second enclosure in a closed position, the second lid being moveable to provide an access opening to the second enclosure; and
    a center case, the center case having
        a center enclosure defining a center interior space, the center enclosure being adapted to be removably attached to the offroad vehicle bridging the longitudinal centerline of the offroad vehicle; and
        a center lid movably connected to the center enclosure and sealing the center enclosure in a closed position, the center lid being moveable to provide an access opening to the center enclosure.

2. The modular cargo system of claim 1, wherein the first enclosure is rigid with two generally planar side walls defining a shape wider toward a rear of the first enclosure than toward a front of the first enclosure, wherein the second enclosure is rigid with two generally planar side walls defining a shape wider toward a rear of the second enclosure than toward a front of the second enclosure, and wherein the center enclosure is rigid with two generally planar side walls defining a shape wider toward a front of the center enclosure than toward a rear of the center enclosure.

3. The modular cargo system of claim 1, wherein a 20 cm diameter sphere can fit within the first enclosure with the first lid in the closed position, and wherein a 20 cm diameter sphere can fit within the second enclosure with the second lid in the closed position.

4. The modular cargo system of claim 1, wherein the first lid hinges to the first enclosure at a front side of the first enclosure, wherein the second lid hinges to the second enclosure at a front side of the second enclosure, and wherein the center lid hinges to the center enclosure at a front side of the center enclosure.

5. The modular cargo system of claim 1, wherein the first enclosure is molded out of a polymer, wherein the second enclosure is molded out of a polymer, wherein the center enclosure is molded out of a polymer, wherein the first lid comprises a first metal top plate which extends generally horizontally when the first enclosure is attached to the offroad vehicle with the first lid in the closed position, wherein the second lid comprises a second metal top plate which extends generally horizontally when the second enclosure is attached to the offroad vehicle with the second lid in the closed position, wherein the center lid comprises a center metal top plate which extends generally horizontally when the center enclosure is attached to the offroad vehicle with the center lid in the closed position.

6. The modular cargo system of claim 5, wherein each of the first metal top plate, the second metal top plate and the center metal top plate comprise hook openings therethrough.

7. The modular cargo system of claim 1, wherein the first side case comprises a first side case handle for holding the first side case with a single hand when the first side case is detached from the offroad vehicle, wherein the second side case comprises a second side case handle for holding the second side case with a single hand when the second side case is detached from the offroad vehicle, and wherein the center case comprises a center case handle for holding the center case with a single hand when the center case is detached from the offroad vehicle.

8. The modular cargo system of claim 7, wherein the first side case handle extends generally longitudinally when the first enclosure is attached to the offroad vehicle with the first lid in the closed position, wherein the second side case handle extends generally longitudinally when the second enclosure is attached to the offroad vehicle with the second lid in the closed position, and wherein the center case handle extends generally transversely when the center enclosure is attached to the offroad vehicle with the center lid in the closed position.

9. The modular cargo system of claim 7, wherein the first side case handle is on the first lid, wherein the second side case handle is on the second lid, and wherein the center case handle is on the center lid.

10. The modular cargo system of claim 7, wherein, when the first side case, the second side case and the center case are each attached to the offroad vehicle with the first lid, the second lid and the center lid all in their closed position, the center case handle is further forward than either the first side case handle or the second side case handle.

11. The modular cargo system of claim 1, wherein the center case comprises a backrest pad for a rider of the offroad vehicle.

12. The modular cargo system of claim 1, wherein the first enclosure and the second enclosure each comprise:

a base adapted to be removably attached downwardly onto the offroad vehicle; and side walls extending upwardly and generally perpendicularly relative to the base, with the side walls defining the access opening;

wherein the base defines a floor plane of the enclosure allowing the enclosure to rest on a flat floor surface when not attached to the offroad vehicle.

13. The modular cargo system of claim 1, wherein the center case comprises a recess for access to a fuel tank fill location on the offroad vehicle.

14. The modular cargo system of claim 1, wherein at least one of the first side case, the second side case and the center case comprise an attachment mechanism extending through a base, the attachment mechanism having an attachment mechanism control handle accessible by hand only through the access opening, wherein hand movement of the attachment mechanism control handle in one direction tightens the base downwardly onto the offroad vehicle, and hand movement of the attachment mechanism control handle in an opposing direction allows detachment of the base from the offroad vehicle.

15. The modular cargo system of claim 1, further comprising:
    a first moveable latch on the first side case for securing the first lid in the closed position;
    a second moveable latch on the second side case for securing the second lid in the closed position; and
    a third moveable latch on the center case for securing the center lid in the closed position.

16. A modular cargo system for an offroad vehicle comprising:
    a first side case, the first side case having
        a first enclosure rigidly defining a first interior space, the first enclosure being adapted to be removably attached to the offroad vehicle entirely on a first side of a longitudinal centerline of the offroad vehicle; and
        a first lid movably connected to the first enclosure and sealing the first enclosure in a closed position, the first lid being moveable to provide an access opening to the first enclosure; and
    a second side case, the second side case having
        a second enclosure rigidly defining a second interior space, the second enclosure being adapted to be removably attached to the offroad vehicle entirely on a second side of the longitudinal centerline of the offroad vehicle opposite the first side; and
        a second lid movably connected to the second enclosure and sealing the second enclosure in a closed position, the second lid being moveable to provide an access opening to the second enclosure;
    wherein the first enclosure and the second enclosure each comprise:
        a base adapted to be removably attached downwardly onto the offroad vehicle; and
        side walls extending upwardly and generally perpendicularly relative to the base, with the side walls defining the access opening;
        wherein the base defines a floor plane of the enclosure allowing the enclosure to rest on a flat floor surface when not attached to the offroad vehicle.

17. The modular cargo system of claim 16, wherein the first interior space and the second interior space are each large enough to hold a helmet of a rider of the offroad vehicle.

18. The modular cargo system of claim 16, wherein the first enclosure and the second enclosure each comprise at least one clip with a clip handle mounted on the side wall of that enclosure, wherein movement of the clip handle in one direction tightens the base downwardly onto the offroad vehicle, and movement of the clip handle in an opposing direction allows detachment of the base from the offroad vehicle.

19. The modular cargo system of claim 16, wherein the base of each of the first and second enclosures is not rectangular.

20. A method of quick attachment of a modular cargo system to an offroad vehicle, comprising:
    simultaneously carrying a first case by only a right hand and a second case by only a left hand, the first case having
        a first enclosure rigidly defining a first interior space, the first interior space being large enough to hold a first helmet of a rider of the offroad vehicle, the first enclosure being adapted to be removably attached to the offroad vehicle;
        a first lid movably connected to the first enclosure and sealing the first enclosure in a closed position, the first lid being moveable to provide an access opening to the first enclosure; and
        a first case handle;
    the second case having
        a second enclosure rigidly defining a second interior space, the second interior space being large enough to hold a second helmet of a rider of the offroad vehicle, the second enclosure being adapted to be removably attached to the offroad vehicle;
        a second lid movably connected to the second enclosure and sealing the second enclosure in a closed position, the second lid being moveable to provide an access opening to the second enclosure; and
        a second case handle;
    wherein the first enclosure and the second enclosure each comprise:
        a base adapted to be removably attached downwardly onto the offroad vehicle;
        side walls extending upwardly and generally perpendicularly relative to the base, with the side walls defining the access opening; and
        at least one clip with a clip handle mounted on the side wall of that enclosure;
        wherein the base defines a floor plane of the enclosure allowing the enclosure to rest on a flat floor surface when not attached to the offroad vehicle;
    placing the base of the first enclosure onto a first platform area of the offroad vehicle;
    moving the clip handle of the first enclosure by hand to secure the first enclosure to the first platform area;
    placing the base of the second enclosure onto a second platform area of the offroad vehicle;
    moving the clip handle of the second enclosure by hand to secure the second enclosure to the second platform area.

21. The method of claim 20,
    wherein the first case further comprises a first hinge connecting the first lid to the first enclosure, with the first enclosure being secured to the first platform area with the first hinge toward a front of the offroad vehicle; and
    wherein the second case further comprises a second hinge connecting the second lid to the second enclosure, with the second enclosure being secured to the second platform area with the second hinge toward the front of the offroad vehicle.

\* \* \* \* \*